UNITED STATES PATENT OFFICE.

HANS A. FRASCH, OF HAMILTON, CANADA.

NICKEL SALT AND PROCESS OF MAKING SAME.

SPECIFICATION forming part of Letters Patent No. 669,899, dated March 12, 1901.

Application filed November 7, 1900. Serial No. 35,744. (No specimens.)

*To all whom it may concern:*

Be it known that I, HANS A. FRASCH, a citizen of the United States, residing at Hamilton, in the county of Wentworth and Province of Ontario, Canada, have invented a certain new and useful Nickel Salt and Process of Making Same, of which the following is a full, clear, and exact description.

The object of this invention is the production of a nickel salt which may be employed directly for nickel-plating and for other purposes.

The invention consists of the nickel salt having the characteristics and properties hereinafter specified and in the method of separating such salt from a solution containing nickel alone or combined with other metallic salts.

I find that a salt of nickel and ammonium in certain proportions is nearly insoluble in a concentrated salt solution and that the nickel-ammonium salt, while readily soluble in water, can be precipitated from an aqueous solution by the addition of another soluble salt, such as sodium chlorid or potassium chlorid or sulfate or any other soluble salt which will not combine with or contaminate the nickel-ammonium salt.

In carrying out my invention I absorb ammonia-gas in a solution of a nickel salt, such as the sulfate or chlorid, until all the nickel and other metals in the solution which are capable of combining with ammonia are transformed into the corresponding ammonium salt, leaving a slight excess of ammonia, or a mixture of metallic salts containing nickel may be exposed in a dry state to the action of ammonia or ammonium carbonate until the salts are converted into the ammonium salts, and these last may then be dissolved in water, and to this solution of metallic ammonium salts is added sodium chlorid until at a certain saturation of the solution with sodium chlorid a nickel-ammonium salt containing approximately six equivalents of ammonia to every one of nickel is precipitated, the addition of sodium chlorid being continued until precipitation ceases. Of these six equivalents of ammonia two are in chemical combination with the nickel and chlorin and four exist as free ammonia. Instead of sodium chlorid I may use potassium chlorid or any other salt which will displace the nickel-ammonium salt. Furthermore, instead of treating the metallic salts or a solution thereof with ammonia-gas ammoniacal solution may be used, in which case the metallic-salt solution may be saturated with sodium chlorid or other suitable salt, to which is added a solution of ammonia of 26° Baumè in strength, which latter solution may be previously saturated with sodium chloride or other salt in sufficient quantity to precipitate the nickel salt.

In carrying out my invention with a solution consisting of the chlorids of several metals—as, for instance, the chlorids of iron, copper, cobalt, and nickel—I first remove the iron by precipitation with calcium carbonate after previous oxidation, if necessary, and separate the precipitate by filtration or other suitable means. I then saturate the solution with ammonia or add to it a concentrated solution of ammonia of about 26° Baumè in strength until the metallic salts are converted into ammonium salts, after which is added sodium chlorid or a solution thereof, upon which a nickel-ammonium salt separates in the form of a crystalline precipitate of purple or violet color. The addition of sodium chlorid is continued until no more precipitate is formed, and when this point is reached no more than two one-hundredths of one per cent. (0.02) of nickel remains in the solution. The precipitated nickel-ammonium salt is separated by filtration and washed with a saturated solution of sodium chlorid containing free ammonia and is then dried in any ordinary manner. The ammonia contained in the residual filtrate may be recovered by distillation, and the copper and cobalt may be removed chemically or by other means.

My salt may be produced from the normal nickel-ammonium chlorid or sulfate by addition of ammonia and precipitation, as above described.

The nickel-ammonium salt obtained by my invention is of great purity and may be directly employed for nickel-plating and for other purposes. Analysis shows it to contain: nickel, 24.7; chlorin, 30.6; ammonium, (combined as $NH_4$,) 14.7; ammonia, (free or combined,) 26.5; cobalt, (as an impurity,) 0.05; sodium chlorid, (as an impurity,) 1.81;

moisture, (as an impurity,) 1.6; total, 99.96. This nickel-ammonium salt on present determination corresponds to the chemical formula $Ni(NH_3)_2Cl_2+4NH_3$. The salt is of purple (violet) color, crystalline, very hygroscopic, and if precipitated from a concentrated salt solution it forms a fine powder of minute crystals, while if dissolved to saturation in hot water large crystals are formed upon cooling which are quadratic in form and of dark-blue or sapphire color. If exposed to dry air, part of its ammonia evaporates and the color changes from purple to green. Exposed to moist air it absorbs the moisture and liquefies, forming a dark-green solution. It is readily soluble in water, forming a blue solution, and parts with some of its ammonia. If exposed to atmospheric air or if part of its ammonia has been allowed to evaporate, it forms a turbid solution which becomes clear upon the addition of ammonia. If boiled in aqueous solution, two-thirds of the ammonia contents evaporate and a green precipitate is formed. The dry salt smells slightly of ammonia and if moistened or dissolved develops a strong odor of ammonia. It differs from the normal nickel-ammonium chlorid or sulfate in the great excess of ammonia it contains, there being about six equivalents of ammonia to every one of nickel, two of said equivalents of ammonia being in chemical combination with the nickel and chlorin and four existing as free ammonia.

What I claim is—

1. The herein-described nickel salt, consisting of a double salt of nickel-ammonium chlorid and four equivalents of free ammonia.

2. The herein-described nickel salt, consisting of nickel, chlorin, and ammonia, and possessing the constitution represented by the formula:

$$Ni(NH_3)_2Cl_2+4NH_3.$$

3. A nickel salt possessing the constitution represented by the formula:

$$Ni(NH_3)_2Cl_2+4NH_3,$$

forming a crystalline mass of violet color, very hygroscopic, freely soluble in water, with a blue color and emitting a strong odor of ammonia.

4. The process of producing a nickel salt, consisting in combining ammonia in excess with a salt of nickel, and precipitating such ammonium-nickel salt from a solution by means of a salt capable of displacing the same.

5. The process of separating a nickel-ammonium salt from a solution, consisting in precipitating the nickel-ammonium salt by dissolving in the solution a salt capable of displacing the nickel-ammonium salt from its solution.

6. The process of producing an ammonium-nickel salt, which consists in saturating a solution containing nickel salt with ammonia until an excess of ammonia is present, and precipitating from the solution the nickel-ammonium salt by the addition of a salt capable of displacing the nickel-ammonium salt.

7. The process of producing an ammonium-nickel salt, which consists in absorbing ammonia in a solution containing nickel, and displacing the nickel-ammonium salt thereby obtained by the addition of sodium chlorid.

8. The process of separating nickel from copper and cobalt and other metals whose hydroxids are soluble in ammonia, consisting in absorbing in a solution of the salts of those metals ammonia in excess, and adding to the solution of metallic ammonium salts thereby obtained a salt capable of displacing the nickel-ammonium salt.

9. The process of separating nickel from a metallic salt containing the same, consisting in absorbing ammonia in excess in a solution of the salt, adding to the solution a salt capable of displacing the nickel-ammonium salt until precipitation ceases, filtering out the nickel-ammonium salt, washing the filtrate with a saturated solution of sodium chlorid containing free ammonia, and then drying.

In testimony whereof I have hereunto set my hand this 5th day of November, A. D. 1900.

HANS A. FRASCH.

Witnesses:
ANNA M. HERRIMAN,
GEO. T. SELLENS.